United States Patent [19]

Downey

[11] 3,933,555

[45] Jan. 20, 1976

[54] METHOD OF MANUFACTURING PHOTOGRAPHIC FILM UNIT

[75] Inventor: Rogers B. Downey, Lexington, Mass.

[73] Assignee: Polaroid Corporation, Cambridge, Mass.

[22] Filed: July 2, 1973

[21] Appl. No.: 375,340

Related U.S. Application Data

[63] Continuation-in-part of Ser. No. 140,537, May 5, 1971, Pat. No. 3,752,722.

[52] U.S. Cl. .................. 156/155; 96/76 C; 156/251; 156/324; 156/272

[51] Int. Cl.$^{2}$ ...................... B32B 31/08; G03C 3/00

[58] Field of Search ........... 156/272, 251, 145, 313, 156/146, 515, 108, 290, 155, 302, 182, 303, 269, 324, 285; 117/34; 219/121 L, 121 LM; 331/94.5 A; 96/3, 68, 29 R, 76 C, 76 R, 201; 204/16.11; 161/410; 53/28, 180, 33, 18 L; 206/820, 454, 316, 455, 219

[56] References Cited

UNITED STATES PATENTS

| | | | |
|---|---|---|---|
| 3,246,739 | 4/1966 | Sable | 206/820 |
| 3,594,261 | 7/1971 | Broerman | 156/252 |
| 3,785,895 | 1/1974 | Ettre et al. | 156/155 |

*Primary Examiner*—Douglas J. Drummond
*Assistant Examiner*—J. J. Gallagher
*Attorney, Agent, or Firm*—Sheldon W. Rothstein

[57] ABSTRACT

A method of fabricating a succession of photographic diffussion transfer film units, each including photosensitive and second sheets secured in face-to-face relation; a container of processing composition; and means for collecting and retaining excess processing composition. In the fabrication method a succession of photosensitive elements are adhered in superposed position with a second element to form a sandwich — such adherence to be accomplished without the employment of external transverse binders or tapes. Other components of the film units, including containers, processing composition trapping elements and associated components are preferably mounted along lateral and/or transverse portions of the structure with subsequent transverse severance of the composite units each from the other to form individual film units.

10 Claims, 4 Drawing Figures

METHOD OF MANUFACTURING PHOTOGRAPHIC FILM UNIT

BACKGROUND OF THE INVENTION

This application is a continuation-in-part of applicant's U.S. Pat. application Ser. No. 140,537, filed on May 5, 1971, now U.S. Pat. No. 3,752,722.

The present invention is directed toward a method of manufacturing diffusion transfer-type photographic film units and particularly units of the configuration, for example, described in U.S. Pat. Nos. 3,594,165 and 3,672,890, which will be discussed in greater detail below. A common denominator of film units of this type and those disclosed, for example, in applicant's U.S. Pat. No. 3,694,206, is in the employment of binding tapes to contribute composite integrity to the individual film units. Such binders not only establish unitary integrity but provide the additional function of aiding in the retention of processing composition within the confines of the film unit and supply an attractive border about the finished print. Retaining the advantages achieved with binding tapes while eliminating the tapes from the system obviously provides the benefits of simplifying the film unit manufacturing scheme with concomitant material and manipulative economic savings.

SUMMARY OF THE INVENTION

Within the context of the present invention, film units of the aforenoted type disclosed in U.S. Pat. Nos. 3,594,165 and 3,672,890 are fabricated without the employment of binding elements which had heretofore been utilized to assure unitary integrity between the two discrete layered elements comprising such film units. It will be appreciated that the film units described in the above-denoted United States patents all comprise two support elements, at least one of which will comprise a multiplicity of coatings, such elements to be secured in superposed relationship. Additionally, the disclosed film units must contain a source of processing composition capable of rendering latent images patent through a diffusion transfer mechanism. In each instance the processing composition is supplied through a rupturable pod attached along a longitudinal edge of the film unit in such a way that the contents of the pod may be spread through a predetermined portion of the film unit. It will be evident that various hydrokinetic forces will be generated by rupturing the pod and spreading its contents between the two opposed support layers which forces must be insufficient to rupture the bonds about the extremities of the superposed layers thereby insuring that no processing composition escapes from the confines of the film units. As has been stated above, such bond integrities have heretofore been provided by binder tapes. According to the present invention it has been unexpectedly found that such binder tapes may be eliminated and each and every function which had heretofore been contributed thereby may be achieved through the employment of edge laminating systems in conjunction with a printed mask element which provides an attractive border surrounding an ultimately produced print.

It is accordingly an object of the present invention to produce a composite diffusion transfer photographic film unit whose unitary integrity is insured by means other than binder tapes, and preferably by the use of lamination techniques.

It is another object of the present invention to provide a film unit of the aforementioned type having a printed mask surrounding the viewing area of the ultimately produced photograph.

It is a further object of the present invention to provide a manufacturing scheme for the production of a photographic film unit for the aforenoted type, such scheme preferably being accomplished by high speed automatic machinery.

These and other objects of the invention are achieved by a novel and improved fabrication and assembly process in which complex and difficult operations are kept to a minimum and a component of the ultimately formed film units is employed as a carrier for transporting the entire unit structure through the sequence of fabrication and assembly operations involved in their manufacture.

Other objects of this invention will in part be obvious and will in part appear hereinafter.

The invention accordingly comprises the method involving the several steps and the relation and order of one or more of such steps with respect to each of the others which are exemplified in the following detailed disclosure and the scope of the application which will be indicated in the claims.

For a fuller understanding of the nature and objects of the invention, reference should be had to the following detailed description taken in connection with the accompanying drawings wherein.

DETAILED DESCRIPTION OF THE INVENTION

In general the present invention is directed toward the fabrication of diffusion transfer photographic film units which comprise two dimensionally stable support layers at least one of which will carry a multiplicity of coatings including photosensitive layers and color image-forming materials. With respect only toward the relationship of the layers employed and not the method of maintaining unitary integrity, film units which may be prepared according to the present invention are disclosed in the aforementioned U.S. Pat. Nos. 3,672,890 and 3,594,165. It will be noted with respect to, for example, the layers of FIGS. 5 of each of the aforenoted patents, the primary difference in the configurations of the elements disclosed is in the order of layers and positioning of the processing composition retention means (i.e., pods). Regardless, however, of the respective layered positions, each of the elements has in common the fact that the extreme opposed surfaces comprise dimensionally stable layers which are maintained in composite, or laminate form, and comprise an integral unit. In the aforementioned patents such adherence is accomplished through the facility of a masking element which doubles as a binding tape. It will additionally be appreciated that within the context of the manufacturing scheme disclosed for such elements in, for example, U.S. Pat. application Ser. No. 135,539, filed in the name of Louis O. Bruneau and assigned to the same assignee as the instant application, a manufacturing scheme comprising a carrier element which doubles as a masking element to provide a format for a colored image is disclosed. In order to fabricate a film unit according to the disclosed system, a discontinuous drive is employed which causes various assembly steps to be accomplished while the film units are in the stopped position.

In contradistinction to that system and to the system disclosed in the parent of the instant application the present manufacturing scheme can be employed with a continuous drive so that from beginning to end the respective sheets and ultimate film units are in a constant state of motion until the individual film units are severed from the continuous elements.

Figure 1:
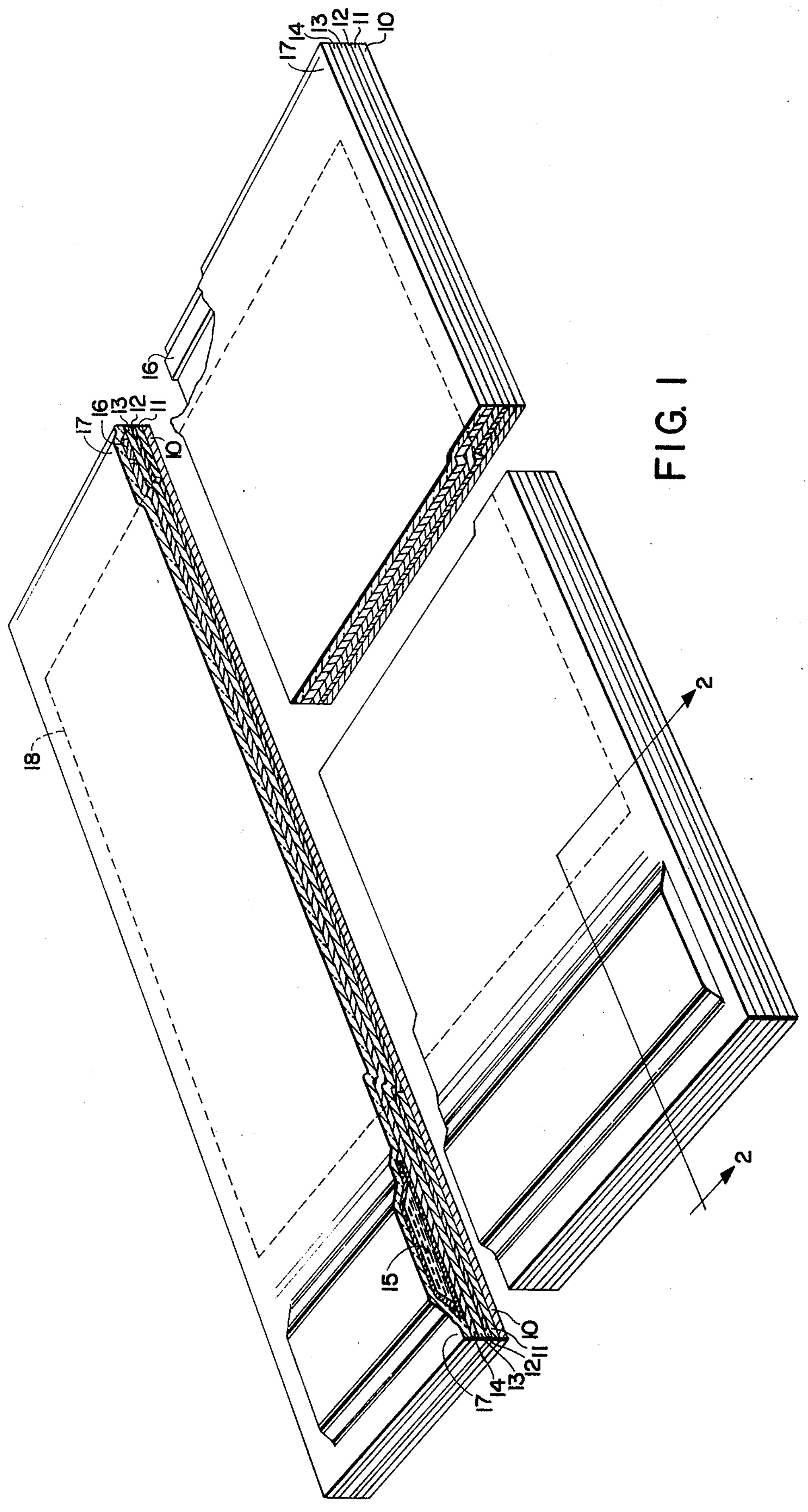
FIG. 1 is a somewhat schematic perspective view, partly in section, illustrating a photographic self-developing film unit manufactured according to the method of the present invention.

With reference now to FIG. 1, a somewhat schematic, partially broken away, highly exaggerated perspective view of a typical film unit which may be manufactured according to the present invention is depicted. Base support element 10 is a transparent dimensionally stable material such as, for example, Mylar or cellulose triacetate upon which is coated a pigmented layer 11 which defines an aperture, said layer comprising preferably titanium dioxide to provide a white border about an ultimately formed color image. Preferably the binder material for such pigmented layer will be substantially solubilized dye image-forming material impermeable so that as an image is viewed through transparent element 10 it will be viewed only within the confines of the aperture defined by layer 11, generally denoted by dotted line 18. Such binder materials may comprise latices for example, certain latices which may be employed in paint technology, e.g., AC-22, sold by Rohm & Haas Co.; and preferably latices with a high content of butyl or ethyl acrylate to enhance sealing. Solvent systems comprising, e.g., cellulose acetate, alkyd resins, etc. may also be employed. Depicted coated over layer 11 is an image-receiving layer 12 in which a color image may be formed, preferably by mordanting diffused solubilized dye image-forming material therein. Coated as a continuous layer over element 12 is a layer 13 comprising a white pigment, preferably titanium dioxide, in a binder which is permeable to dye image-forming material, such as, for example, polyvinyl alcohol, gelatin, polyacrylamide, etc. This layer will provide a white background against which the ultimately formed image will be viewed. Over layer 13 are coated a multiplicity of photosensitive layers in conjunction with color image-forming materials, denoted 14, which, within the context of such diffusion transfer film units, will preferably comprise yellow, magenta and cyan dye developers along with blue-sensitive, green-sensitive and red-sensitive silver halide emulsion layers. Since layer 12 alone may be insufficient to provide the required degree of light security in the embodiment depicted, it is preferred to employ a loading of, for example, carbon black in the layer next adjacent thereto or in a discrete layer adjacent thereto. Furthermore, since the dye developer and emulsion layers comprise costly materials, they are preferably coated only along the portion of the base element coincident with the aperture in layer 11. Along one edge of the photosensitive-dye image-forming material layers — and preferably slightly overlapping that edge — is a processing composition container 15, while along the opposed edge of the film unit is a processing composition trapping element 16 capable of absorbing and retaining excess processing composition resultant from rupture of container 15 and spreading of the processing composition over layers 14. Transparent dimensionally stable cover sheet 17 is shown laminated to layer 10 about the peripheral edges thereof through layers 11, 12, 13 and 14. It will be appreciated, however, that within the context of the present invention, pod 15 may extend to the transverse extremities of the film unit and may be so treated along such extremities that lamination of the entire unit through the edges of said pod may be accomplished, as, for example, by being coated with a heat-activatable adhesive material.

Figure 2:
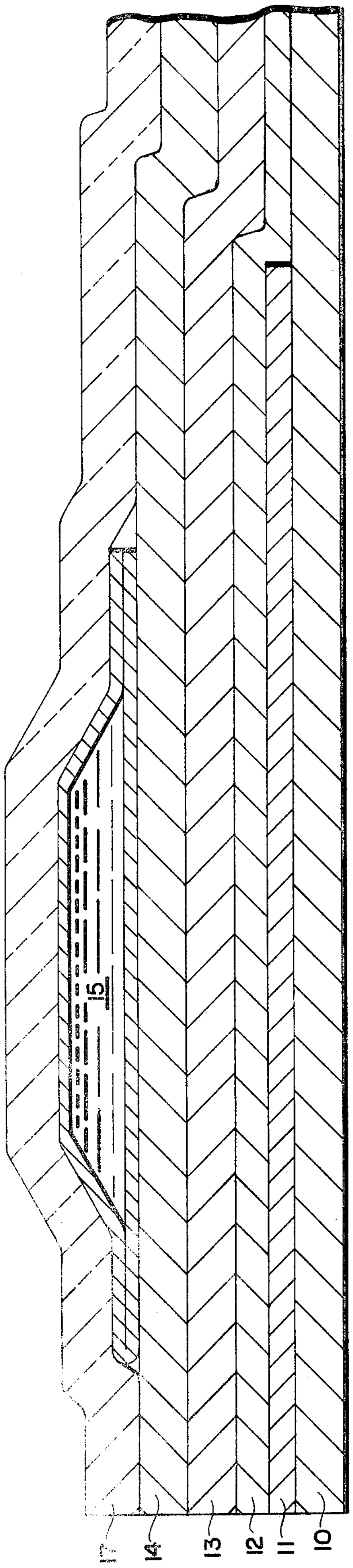
FIG. 2 is a sectional view along line 2—2 of FIG. 1 depicting the relationship of the various layers of constituent components of film units which may be manufactured according to the present invention.

FIG. 2 is generally a side, cross-sectional view through the line 2—2 of FIG. 1 and denotes the relative relationships of the layers each to the other in exaggerated form. With respect to FIG. 2, it is interesting to note that in a film unit embodiment according to the general scheme of the aforementioned U.S. Pat. No. 3,672,890, pod 15 is so positioned as to deposit its contents between base layer 10 and the photosensitive layers rather than between cover layer 17 and the photosensitive layers. Exposure in the latter instance is through layer 17 while in the former instance, exposure is accomplished through layer 10. Accordingly, element 17 in the former embodiment will preferably be opaque so that development may be accomplished in the light. Furthermore, in the latter instance, the processing composition will preferably contain an opacifying material such as carbon black, in sufficient concentration to prevent fogging of the photosensitive elements by ambient light conditions, while in the former configuration, the dye-permeable layer of titanium dioxide will be provided by the processing composition rather than coated during manufacture. Obviously, in the former configuration, there will be no carbon black adjacent the image-receiving layer — light opacification being accomplished by alkali-responsive dye systems as disclosed, for example, in U.S. Pat. No. 3,672,890. In order to make the latter film unit more aesthetically pleasing, layer 17 might have printed thereon, by the same technique employed with regard to printing the masked layer on layer 10, a mask element preferably of a black pigment, such as carbon black, which is capable of masking from view the processing composition retaining pod and trap employed to absorb excess processing composition. It will accordingly be appreciated that a viewer of the film unit through element 17 will see nothing but a black background as the rear surface of the finished photograph.

Masking layer 11 has as its basic function the provision of a sharply defined image-free border surrounding a transfer image which extends to the edge of the border. The masking layer is preferably applied to element 10 prior to the application of element 12. However, it is to be noted that for convenience of manufacture, layer 12 may be applied to element 10 prior to application of layer 11, it being unnecessary to maintain the order of these elements as depicted in FIG. 2. The aperture in layer 11 defines the extent of the visible image and, as aforenoted, preferably comprises a white pigment such as titanium dioxide carried in a suitable binder, preferably a polymer which is A liquid during formation of the masking layer and solidifies to form a stable dye image-forming material-impermeable adherent layer. The masking layer 11 can be formed and applied to element 12 by numerous wellknown systems including, for example, conventional printing methods such as the gravure process. Layer 11 insures that any diffusible image-providing material formed on the photosensitive layer side thereof be hidden from view. The preferred location is as depicted in FIG. 2.

Figure 3:
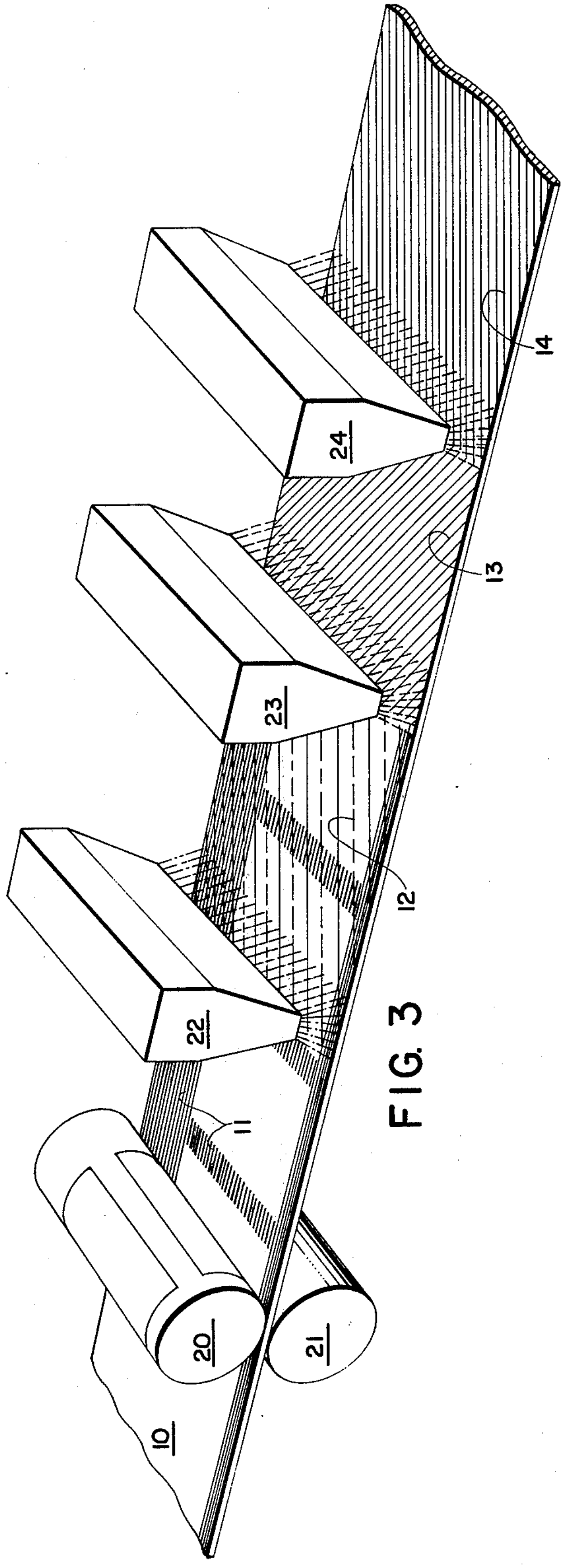
FIG. 3 is a schematic view depicting a portion of the coating stations which may be employed in producing one element of the film unit shown in FIG. 2.

With regard to the manufacture of coated base element 10, reference is directed toward FIG. 3 where a transparent strip comprising base element 10 is directed to a gravure printing station where embossed gravure roll 20 and base support roll 21 are shown applying a pigmented layer 11 to base layer 10 in the configuration of a mask which will define the area of the ultimately formed photographic print. In a separate operation downstream of the gravure coating station is coating station 22 at which a coating 12 is applied, said coating comprising an image-receiving layer; downstream of coating station 22 is coating station 23 from which layer 13, a dye-permeable pigmented layer capable of providing a background against which an ultimate image may be viewed, is deposited. In a subsequent coating station or stations 24, various photosensitive layers associated with image-forming materials are deposited and denoted as layers 14. It will be noted that for economic reasons these various layers which comprise costly components are deposited on sheet 10 in a strip narrower than sheet 10 so that subsequently pods and traps may be adhered to sheet 10 at a position substantially devoid of emulsion and dye materials. Subsequent to the application of the emulsion and dye layers to base 10, the material is rolled and stored prior to being placed in an assembly system. It should be understood that the various coated layers may be applied in line or on separate occasions. Application techniques for the layers denoted and appropriate apparatus are well known in the photographic and printing arts.

Figure 5:
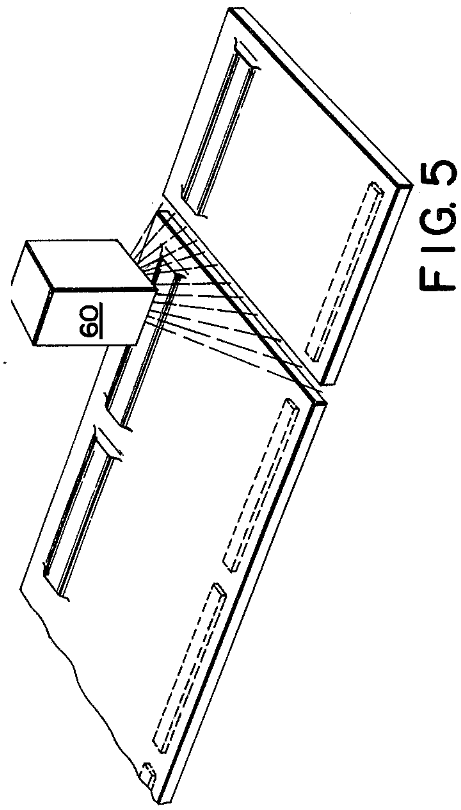
FIG. 5 is a view of an alternate lamination section of FIG. 4 which depicts a laser lamination and severing apparatus.
Figure 4:
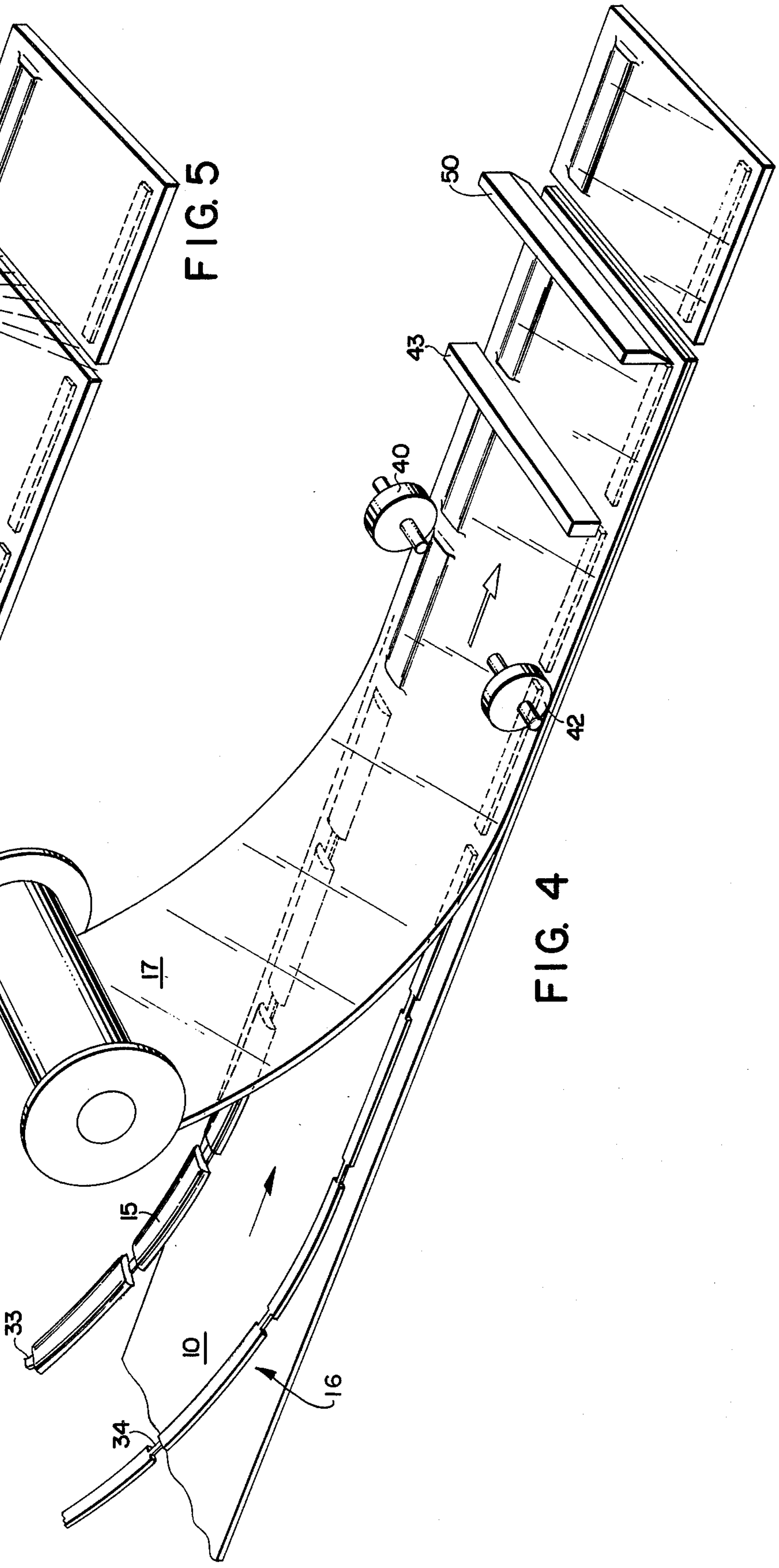
FIG. 4 is a somewhat schematic perspective view illustrating the sequential assembly operations exemplifying the manufacturing scheme of the present invention employing a continuous drive system.

Assembly of film units noted above may best be envisioned with respect to FIG. 4 which depicts a continuous method of fabricating film units as described above. According to the preferred method, a roll of the coated material, prepared as described, for example, in FIG. 3, is conveyed along conventional continuous transfer means to a point whereupon opposed longitudinal edges of the base material are contacted with continuous strips of processing composition retaining containers 15 and excess processing composition capture means 16 are secured in place by conventional means as, for example, pressure-sensitive adhesives, etc. Preferably, the continuous roll of pods and traps will each comprise components adhered, each to one another, by a narrow band of thermoplastic material 33 and 34, respectively, capable of enhancing the ultimate bond achieved between the base element 10 and cover element 17. Preferably, the rupturable bond of container 15 will slightly overlap the photosensitive area of coated base element 10 to assure that upon rupture the entire contents of the container will be spread across coated base element 10 toward means 16. It is sufficient with regard to the sealing of container 15 to base element 10 that only the edge of the container adjacent the edge of base element 10, or alternatively the transverse container edges may be adhered to the element 10. Since such a bonding will be sufficient to hold the container in place throughout the rest of the fabrication process the means 16 may preferably be heat-sealed in place or put in place in any conventional adherent fashion. Downstream of the positions at which the pods and traps are adhered to coated base element 10, a roll of transparent dimensionally stable material comprising element 17 is fed in opposed relation with element 10 between heated rollers 40 and 42 which provides a secure heat seal of said coated base element 10 to said element 17. In order to provide the requisite dwell, it may be necessary to employ a multiplicity of heated rollers adjacent one another. It should be noted that the seals provided by elements 40 and 42 along the longitudinal edges of the composite structure are generally outboard of the pod and trap, respectively. Secure seals are provided with lamination temperatures of about 250° F. and dwells on the order of about 0.3 sec. with materials disclosed herein and in the aforementioned U.S. Pat. Nos. 3,672,890 and 3,594,165. In order to enhance heat sealing, it is recommended that a material such as, for example, Versamid, sold by General Mills, Inc., be added to the border pigmented layer. At a station subsequent to providing longitudinal seals, a transverse sealing unit 43 is provided which establishes a secure bond between the pod extremities, thereby laminating elements 17 and 10 and providing a secured unitary structure. As before, a number of laminating elements may be required or a lamination head may be employed in square wave fashion so that it "follows" the elements for the requisite dwell period. Subsequent to completion of lamination, individual film units are severed from the continuous structure by knife 50, which cuts through the laminated areas established between the pods. The ultimate product is a film unit without binder tapes and may be fabricated by a continuous process. While heat-sealing techniques have been found to provide satisfactory results, a laser lamination system may also be employed as depicted in FIG. 5. Such system may be a flying scanner 60 which will provide both sealing and severance functionality to the individual film units. A carbon dioxide continuous pulse laser, such as those sold by American Optical Company of Southbridge, Mass., is recommended. It is also anticipated that conventional ultrasonic means may be employed in providing the lamination functionality to the present invention.

The rupturable container retaining processing liquid for each film unit is of a type well-known in the art and described, for example, in U.S. Pat. No. 2,543,181. It is formed by folding a rectangular blank of fluid and vapor impervious sheet material medially and sealing the marginal sections of the blank to one another to form a cavity for containing processing liquid. The seal between the longitudinal marginal sections is weaker than the seals at the end of the container so that in response to the application of compressive pressure to the walls of the container in the region of the liquid-filled cavity there will be generated within the liquid, hydraulic pressure sufficient to separate the longitudinal marginal sections with a concomitant discharge of processing composition from the liquid-filled cavity in the anticipated direction toward the photosensitive layers. In addition, if considered necessary the coated base element 10 and element 17 may be prelaminated each to the other according to well-known techniques such as, for example, as described in the parent of the present application.

In certain film unit embodiments, particularly, for example, that of aforenoted U.S. Pat. No. 3,672,890, it may be desirable to provide a processing "gap" between elements 10 and 17. This will preferably be provided by adjustment of the compressive pressure-providing mechanism of the camera in which such film units are to be employed, but may also be provided by supplying the film units with transverse shims or rails.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. A method of forming an integral diffusion transfer photographic film unit which comprises first and second sheet elements adhered to one another in opposed relationship, at least one of said sheet elements comprising a layer comprising image-forming materials and at least one of said sheet elements comprising an image-receiving layer, which method comprises:

securing adjacent a longitudinal edge of an extended length of said first sheet element, sequentially, a multiplicity of rupturable containers retaining diffusion transfer processing composition so that upon the application of compressive force to a container the contents thereof will be directed toward the longitudinal edge of said first sheet element opposed to the edge adjacent to which said containers are secured;

superposing an extended length of said second sheet element over said first sheet element and securing said second sheet element to said first sheet element by sealing said sheet elements each to the other along at least the longitudinal edge of said superposed elements opposed to the edge adjacent to which said rupturable containers are secured, and sealing the transverse areas normal to said longitudinal seal lying between said sequentially secured containers of processing composition, thereby establishing a composite film unit capable of retaining distributed processing composition; and severing said composite film units from said extended lengths of said first and second sheet elements through sealed traverse areas.

2. The invention of claim 1 wherein a multiplicity of elements capable of retaining excess processing composition are adhered, sequentially, adjacent the longitudinal edge of said first sheet element opposed to the edge adjacent to which said containers are secured, prior to superpositioning of said second sheet.

3. The invention of claim 1 wherein said first sheet is sealed to said second sheet through at least one layer which provides adhesive functionality by means of the application of heat.

4. The invention of claim 3 wherein said heat is applied for about 0.3 seconds at about 250° F.

5. The invention of claim 1 wherein sealing of said transverse areas is produced by laser energy.

6. The invention of claim 5 wherein said film units are severed from the extended lengths of said first and second elements by laser energy.

7. The invention of claim 6 wherein said laser energy is provided by a continuous pulsed laser.

8. The invention of claim 1 wherein said second sheet element is sealed to said first sheet element along said longitudinal edge adjacent said secured rupturable container.

9. The invention of claim 1 wherein said rupturable containers are adhered along said longitudinal edge of said first sheet in a continuous strip comprising said containers adhered, each to the other, by a narrow band of thermoplastic material capable of enhancing the bond between said first and second sheets upon the application of heat.

10. The invention of claim 9 wherein excess processing composition capture elements are adhered to said first sheet along the longitudinal edge thereof opposed to the edge adjacent said rupturable containers in a continuous strip comprising said capture elements adhered each to the other by a narrow band of thermoplastic material capable of enhancing the bond between said first and second sheets upon the application of heat.

* * * * *